United States Patent [19]
Shreve

[11] 4,023,109
[45] May 10, 1977

[54] SEQUENCE CONTROL SYSTEM WITH TIMED OPERATIONS

[75] Inventor: Richmond B. Shreve, Shaker Heights, Ohio

[73] Assignee: The Van Epps Design and Development Co., Inc., Cleveland, Ohio

[22] Filed: Aug. 14, 1975

[21] Appl. No.: 604,795

[52] U.S. Cl. .............................. 328/75; 235/153 R; 307/232; 328/130; 340/223

[51] Int. Cl.[2] ................ H03K 17/00; H03K 21/34; G08B 23/00

[58] Field of Search .... 235/153 R, 153 A, 153 BK; 328/75, 109, 110, 129, 130; 307/232, 293; 340/223, 172.5

[56] References Cited
UNITED STATES PATENTS

| | | | |
|---|---|---|---|
| 3,214,695 | 10/1965 | Betz | 328/75 |
| 3,399,351 | 8/1968 | Reska | 307/232 |
| 3,450,995 | 6/1969 | Hirsch | 328/75 |
| 3,525,082 | 8/1970 | Jensen | 340/172.5 |
| 3,634,769 | 1/1972 | Sleater et al. | 328/75 |
| 3,638,189 | 1/1972 | Gamache et al. | 328/75 |
| 3,668,652 | 6/1972 | Zahn | 340/172.5 |

*Primary Examiner*—Stanley D. Miller, Jr.
*Attorney, Agent, or Firm*—Bosworth, Sessions & McCoy

[57] ABSTRACT

A system for checking and controlling a sequence of operations including a plurality of logic circuits corresponding to the number of operations. A bistable latch circuit has complementary outputs connected to inputs of two gates. A counter counts timing pulses and has its output connected to another input of each gate. If a signal is received by the latch indicating completion of an operation prior to the counter reaching a predetermined count, one gate provides a signal enabling the sequence of operations to continue. If the counter reaches the predetermined count prior to receipt of the signal by the latch, the other gate provides a signal to interrupt the sequence of operations.

10 Claims, 2 Drawing Figures

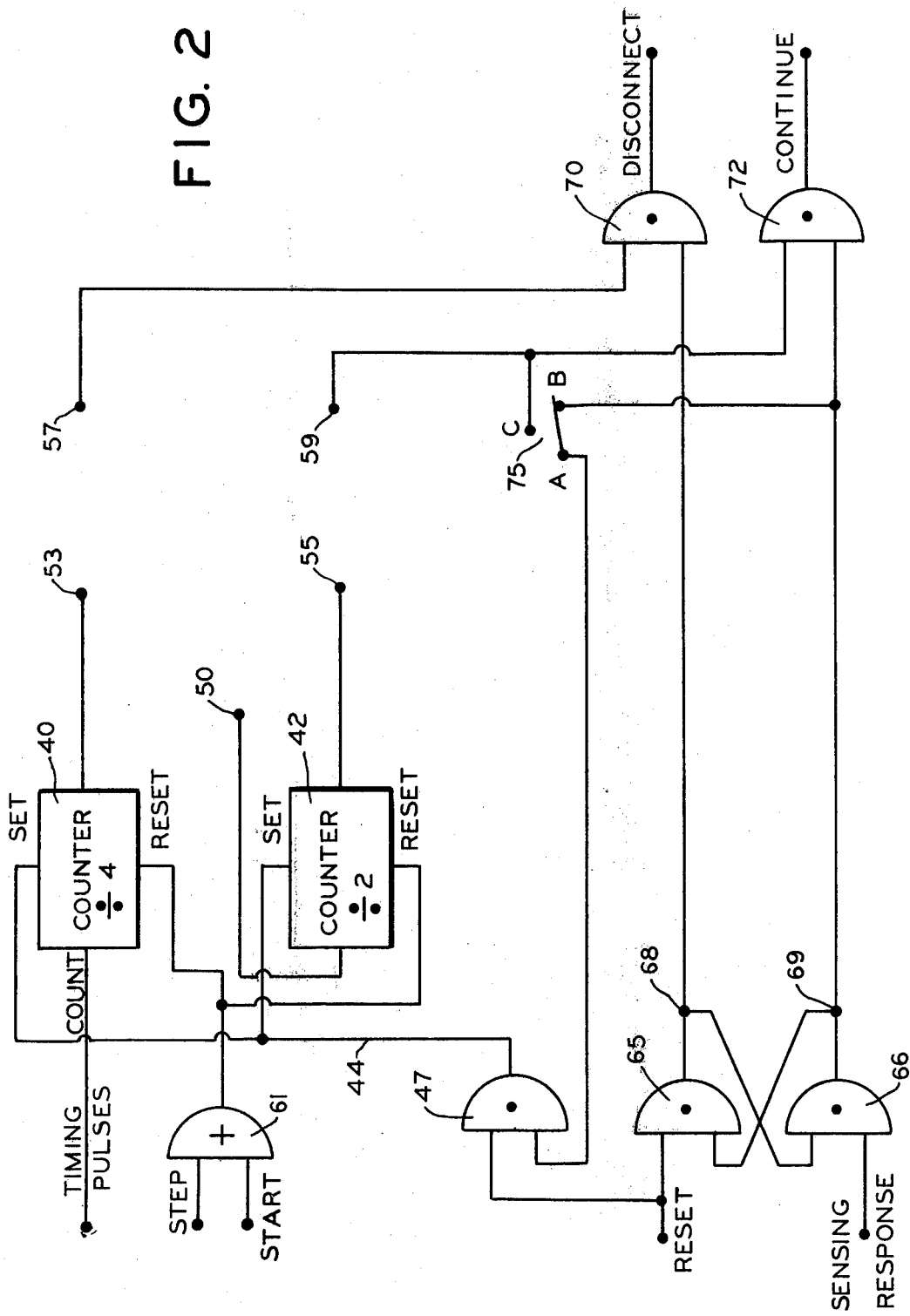

SEQUENCE CONTROL SYSTEM WITH TIMED OPERATIONS

BACKGROUND OF THE INVENTION

This invention relates to sequence control systems and more particularly to an improved system which is programmable to control both the sequence of a set of operations to be performed and the time allotted for performance of each operation.

In many manufacturing operations in which a machine performs a series of operations automatically, it is desirable to monitor the operation of the machine and to control it to ensure that an operation may be initiated only if a preceding operation has been satisfactorily completed. Typical, known arrangements for controlling a sequence of steps or operations involve the use of electronic shift registers or ring counters and are limited in the scope of their monitoring function. The arrangements which do perform a monitoring function may be quite complex and often involve the use of programmed computers which require skilled operators to use and to maintain.

SUMMARY OF THE INVENTION

A general object of this invention is to provide a sequence control system which is easily adaptable to a variety of applications involving both sequence control and monitoring while being simple to operate and to maintain.

A related object of this invention is to provide such a sequence control system which is programmable both as to the sequence of operations to be performed and as to a time allotted for performance of each operation.

Another object of this invention is to provide such a sequence control system in which the sequence of operations may be interrupted as a safety measure if any time-monitored operation is not completed within the allotted time.

Still another object of this invention is to provide a logic circuit which may be combined with like logic circuits to form a sequence control system embodying the present invention.

A preferred form of the present invention includes means for responding to a series of timing signals by providing an output signal indicative of the passage of a time allotted for completion of an operation and a bistable latch means for receiving and storing a signal indicating the completion of an operation. Gate means are coupled to the latch means and the timing signal responsive means for providing a signal indicating the sequence of occurrence of the operation completion signal and the allotted time passage signal. If the operation signal occurs first, the signal from the gate means enables the sequence of operations to continue. If the allotted time passage signal occurs first, the sequence of operations is interrupted.

BRIEF DESCRIPTION OF THE DRAWINGS

FIG. 2 is a logic diagram of one of the logic units of the system of FIG. 1.

DESCRIPTION OF A PREFERRED EMBODIMENT

Figure 1:
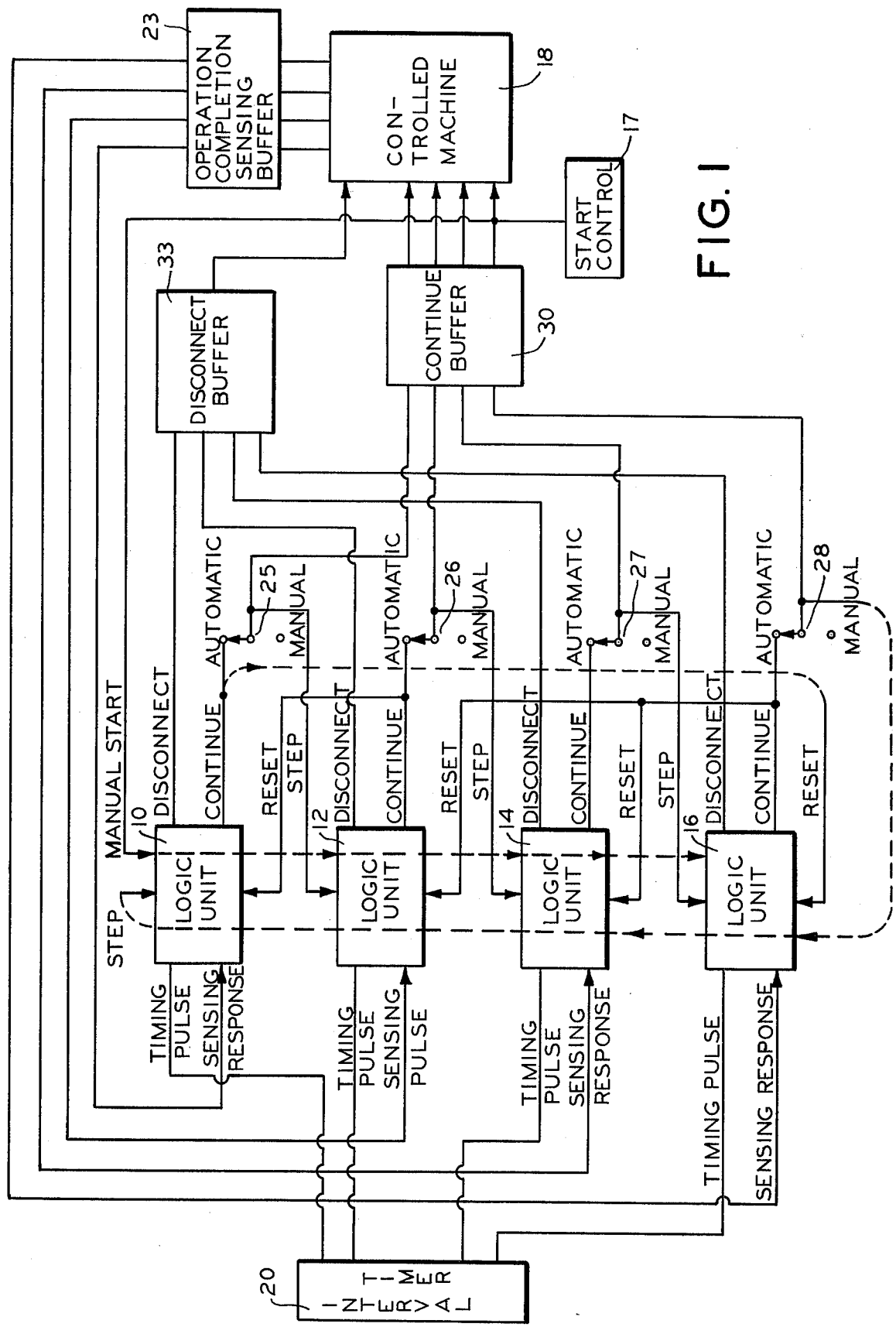
FIG. 1 is a block diagram of a sequence control system embodying the present invention connected to a machine controlling the sequence of operations thereof.

Referring now to FIG. 1, a control system embodying the present invention includes a series a logic units, four being shown and identified by the numerals 10, 12, 14 and 16. A given system may employ any reasonable number of logic units corresponding to the number of operations to be controlled in a particular application. In the control system each logic unit is connected in a given application to initiate a particular operation in a sequence of operations performed by a controlled machine or apparatus and to monitor the time required for completion of the operation. For example, an automatic machine may be programmed by external means to perform a sequence of operations on an object such as a workpiece in the manufacture of a product. A system according to the present invention can be connected to such a machine and programmed to permit the beginning of an operation only after the sequentially preceding operation has been completed within an allotted time.

Each logic unit has provision for receiving five input signals and two output signals. One input signal to each unit is a manual start command from a start control module 17 which is also connected to start the controlled machine indicated at 18. The manual start command is supplied only to the particular logic unit which is programmed to monitor the first operation in the sequence of operations being controlled and only in the first cycle of operations. Operation of each logic unit is initiated thereafter by a signal from the preceding unit as will be explained in detail below. Each logic unit also receives timing pulses from an interval timer 20. The rate of such timing pulses may be selected for each individual logic unit according to the length of time allotted for completion of the operation being monitored by the particular logic unit. Another input provided to each logic unit is a sensing response signal through a buffer 23 from the controlled machine 18. This sensing response signal indicates that the particular operation being monitored has been completed. The remaining input signals to each logic unit are a step command from the immediately preceding logic unit which is equivalent to a start command, and a reset command from a following logic unit which resets the logic unit to an initial condition.

One output signal from each logic unit is a continue signal which is provided through a corresponding automatic-manual switch 25, 26, 27 or 28 to a continue buffer 30 and from there to controlled machine 18 to indicate that the immediately preceding operation has been completed within the allotted time and to initiate the next operation in sequence. The continue signal from a particular logic unit is also provided through the appropriate automatic-manual switch to the step input of the next unit in sequence to initiate the monitoring operation of the next unit for the corresponding operation. A particular application may require that two or even more operations of a controlled machine occur simultaneously. In that case, the continue signal from a particular logic unit may be supplied as a step input signal to two or more logic units each of which is to monitor one of the simultaneous operations.

The continue signal from the particular logic unit may also be provided to a preceding logic unit to reset that unit at an appropriate time. It should be noted that a continue signal may be provided to reset a logic unit other than the immediately preceding unit and also may be provided to reset more than one preceding unit simultaneously.

The remaining output signal from each logic unit provides a disconnect signal through a buffer 33 to the controlled machine 18 in the event that the operation being monitored is not completed within the allotted time. This disconnect signal may be used to interrupt power to the controlled machine. The disconnect signal may, of course, be used to initiate any other desired action to prevent damage to property or injury to personnel or merely to serve as an indication to a human operator that the sequence of operations is "hung up" at a particular operation and requires human intervention.

The system of FIG. 1 is prepared for operation by programming according to the sequence of machine operations to be monitored. The operations to be monitored may first be listed in the order in which they are to occur. A time allowance is then established for each operation and the timing pulse input of each logic unit is connected to the appropriate output of interval timer 20. The appropriate interval timer output is, for reasons that will become apparent from the description of FIG. 2 below, one that will provide pulses having an interval therebetween slightly longer than one-fourth of the time allowance for each operation. The sensing response input of each logic unit is then connected through buffer 23 to the sensor which indicates completion of the respective operation being monitored. The disconnect output of each logic unit is then connected to disconnect buffer 33 which has a single output connected to the controlled machine 18. A signal from the output of buffer 33 may be used to initiate a power shutoff or other action to be taken in the event a disconnect signal is received from any of the logic units.

The manual start input from the first logic unit 10 is connected to the start control module 17 so that the logic unit will receive a start signal when the controlled machine 18 begins the first operation in the initial sequence of operations. The continue output from the first logic unit 10 is connected through its automatic-manual switch 25 and buffer 30 to the controlled machine 18 so that the continue signal can initiate the next operation. The continue output from logic unit 10 is also connected through automatic-manual switch 25 to the step input of the next logic unit 12 to enable that unit to compare the time allotted for the operation which it monitors to the time in which the operation is actually completed. In like manner, the continue outputs from logic units 12 and 14 are connected through buffer 30 and their automatic-manual switches to the controlled machine 18 so that the continue signals from the logic units can initiate the next operation in sequence. The continue outputs from the logic units 12 and 14 are also connected to the step inputs of, respectively, logic units 14 and 16.

The continue outputs from the various logic units are also connected to the reset input of a preceding logic unit. For example, the continue output of logic unit 10 is connected to reset logic unit 16 while the continue output of logic unit 16 is connected to reset inputs of logic units 12 and 14. As mentioned above, two or more logic units may be reset simultaneously by the same continue output signal from a subsequent logic unit. Likewise, if a program calls for two or more operations to occur simultaneously the continue output from a preceding logic unit may be connected to the corresponding number of subsequent logic units and through continue buffer 30 to initiate the desired operations in the controlled machine 18.

The continue output of the final logic unit 16 is connected to the step input of the first logic unit 10 and also through its automatic-manual switch 28 and buffer 30 to the controlled machine 18. The start signal from start control module 17 will initiate the first operation in the first sequence after start of the controlled machine. In succeeding cycles the first operation of each sequence will be initiated by the continue output from logic unit 16.

In operation, a start signal from start control module 17 will initiate the first operation of the controlled machine 18 and is also transmitted to logic unit 10 to enable that unit to compare the time allotted for completion of the first operation to the time required for completion of the operation. If a sensing response pulse is received within the time allotted, logic unit 10 will produce a continue output signal through buffer 30 to initiate the next operation. The continue signal will also be provided to the next logic unit 12 to enable it to compare the time required to complete the next operation to the time allotted for the operation. The cycle of operation continues in this manner through logic unit 16 which provides a continue signal to controlled machine 18 through buffer 30 to initiate the next cycle of operation. The continue signal is also provided as a step input to the first logic unit 10 to enable it to monitor the first operation in the new cycle.

If a sensing response for any operationn is not received by the appropriate logic unit within the time allotted for completion of the operation, the logic unit will generate a disconnect signal to buffer 33. This buffer may be designed to initiate a predetermined action in response to a disconnect signal such as interruption of power to the controlled machine 18, generation of a warning signal or other action considered appropriate in the particular application.

Referring now to FIG. 2, each of the logic units identified in FIG. 1 by the numerals 10, 12, 14 and 16 includes a divide-by-four counter 40 and a divide-by-two counter 42. Each counter has a count input terminal and set and reset input terminals. The count input terminal of counter 40 is connected to receive timing pulses from the interval timer 20 (FIG. 1). The set input terminals of counters 40, 42 are connected together and through line 44 to the output of a gate 47. The count input terminal of counter 42 is provided as a programming terminal 50 as is the output terminal 53 of counter 40 and the output terminal 55 of counter 42. Terminals 50, 53 and 55 are provided for interconnection with terminals 57 and 59 for programming variations in a manner and for a purpose which will be described below.

The reset input terminals of counters 40, 42 are connected together and to the output terminal of an OR gate 61. One input terminal to OR gate 61 is for receipt of a start signal from start control module 17 (FIG. 1) in the event that the particular logic unit is programmed to monitor the first operation in the operational sequence. The remaining input terminal of gate 61 is for receipt of a step signal which is the continue signal from the immediately preceding logic unit.

The logic unit also includes gates 65 and 66, one input of each being cross-coupled to the output of the other to form a bistable latch. The remaining input terminal of gate 65 of the latch is for receipt of a reset signal which is the continue signal from a subsequent logic unit. This reset input terminal is also connected to an input terminal of gate 47. The remaining input terminal to gate 66 of the latch is for receipt of a sensing response signal from the controlled machine 18 through an operation completion sensing buffer 23 (FIG. 1) which indicates completion of the operation being monitored. The latch has two output terminals, an interrupt output terminal 68 from gate 65 and an enable output terminal 69 from gate 66. The interrupt output terminal is connected to an input terminal of the disconnect gate 70 while the enable output terminal 69 is connected to an input terminal of the continue gate 72. The enable output terminal 69 is also connected through switch 75 to one input terminal of gate 47 when switch 75 is not actuated. The remaining input terminal of disconnect gate 70 is connected to programming terminal 57 while the remaining input terminal of continue gate 72 is connected to programming terminal 59. Gate 70 will provide a disconnect output signal if the time allotted for completion of the operation being monitored, as determined by counter 40, expires before a sensing response input signal is received by gate 66. Gate 72 will provide a continue output signal if a sensing response signal is received by gate 66 before expiration of the time allotted for completion of the operation being monitored.

Prior to operation, the logic unit will normally be in the reset condition, that is, the latch comprising gates 65 and 66 will be in the reset condition, neither gate 70 nor gate 72 will be enabled to produce its appropriate output signal and counters 40 and 42 will be latched in the reset condition by the output condition of gate 61. Timing pulses from interval timer 20 (FIG. 1) are provided to the input of counter 40, but the counter is not enabled to count them. When a start signal, or a step signal from a preceding unit, is received by gate 61, both counters 40 and 42 are released from their reset condition and counter 40 begins to count timing pulses from interval timer 20. Generally speaking, if a sensing response signal is received at the input terminal of gate 66 before counter 40 has counted 4 timing pulses, an enable output signal from output terminal 69 of the latch will enable one input of continue gate 72, will disable gate 70 through gate 65 and will also pass through gate 47 and switch 75 to set both counter 40 and counter 42. One of counters 40, 42 will have its output terminal connected to terminal 59 and the set signal therefrom will enable the other input of gate 72 and allow the gate to produce a continue output signal.

Prior to the receipt of a sensing response input signal at gate 66 the interrupt signal output 68 of the latch is present at one input of gate 70. If a sensing response input signal is not received at gate 66 prior to counter 40 counting four timing pulses, then the second input of disconnect gate 70 will be enabled by the output signal from either counter 40 or counter 42 as will be described below and will provide a disconnect output signal for the purpose described above.

Programming terminals 50, 53, 55, 57 and 59 may be interconnected in either of two ways to control the timing relationship between the continue output signal, the disconnect output signal and the programmed time allotted for completion of the operation being monitored. Consider first both terminals 57 59 connected to terminal 53 with terminals 50 and 55 open. In that case, a continue signal from gae 72 will be issued when counter 40 is set as described above by an enable output signal from gate 66 and, along with the enable output signal at terminal 69, enables gate 72. A disconnect signal from gate 70 will be issued when counter 40 has counted the fourth timing pulse without receipt of a sensing response signal at gate 66 so that the counter, along with the interrupt signal at terminal 68, enables gate 70.

The second interconnection among the programming terminals is terminal 53 connected to both terminals 50 and 59 and terminal 55 connected to terminal 57. In that case, a continue signal will be issued from gate 72 upon receipt of a sensing response input signal as in the first described interconnection. A disconnect signal, however, will be delayed until counter 42 has counted one additional timing pulse and then, along with the interrupt signal at terminal 68, enabled gate 70 to provide a disconnect signal.

Another possible programming variation is actuation of switch 75 to connect its terminal A to terminal B rather than terminal C. In that case, the enable signal at latch output 69 disables gate 70 as described above, but does not set counters 40 and 42. The continue signal thus is not provided by gate 72 immediately upon receipt of a sensing response signal at gate 66. Instead, gate 72 is enabled to provide a continue signal only after counter 40 and/or 42 has counted the number of timing pulses corresponding to the programmed allotted time and then enabled gate 72 to provide a continue signal.

A continue signal provided by gate 72 is maintained until a reset signal is received at the input terminal of gate 65 from a subsequent logic unit as described above.

A circuit including counters 40 and 42 and gates 47 and 61 and the connections therebetween may conveniently be formed by utilizing the integrated circuit identified as No. SN7490 Decade Counter available from Texas Instruments, Inc. and other integrated circuit manufacturers.

While a preferred form of the present invention has been specifically shown and described herein, it will be apparent to those skilled in the art who come to understand the principles and advantages of the invention that modifications and changes may be made in the form herein specifically disclosed without departing from the spirit and scope of the invention. Accordingly, this invention is not to be limited to the form specifically shown and described herein nor in any other way inconsistent with the progress in the art promoted by the invention.

What is claimed is:

1. A logic circuit for determining the completion within an allotted time of one of a series of sequential operations comprising
    means for responding to a signal indicating the start of said allotted time and to a series of timing signals thereafter by providing an output signal indicative of the passage of said allotted time for completion of an operation,
    bistable latch means for receiving and storing a signal indicating the completion of said operation, and
    gate means coupled to said latch means and to said timing signal responsive means for providing a signal indicating the sequence of occurrence of said operation completion signal and said allotted time passage signal.

2. A logic circuit as claimed in claim 1 wherein said timing signal responsive means includes a digital counter for counting a predetermined number of said timing signals.

3. A logic circuit as claimed in claim 1 further comprising switch means between said latch means and said gate means for programming the time occurrence of a signal from said gate means indicating completion of said operation within the allotted time.

4. A logic circuit as claimed in claim 1 further comprising means between said gate means and said timing signal responsive means for programming the time occurence of a signal from said gate means indicating passage of the allotted time prior to reception of said operation completion signal.

5. A logic circuit as claimed in claim 4 wherein said means for programming the time occurrence of a signal from said gate means indicating passage of the allotted time prior to reception of said operation completion signal includes a digital counter connected to the output of said timing signal responsive means for delaying the occurrence of said signal indicating the passage of the allotted time prior to reception of said operation completion signal.

6. A control system for checking and controlling a sequence of operations comprising
   timing means for providing timing signals at intervals establishing a predetermined allotted time for completion of each operation, and
   a plurality of logic circuits corresponding to the number of operations to be performed, each logic circuit comprising:
      means responsive to said timing signals for providing an output signal indicative of the passage of said allotted time for completion of an operation,
      bistable latch means for receiving and storing a signal indicating the completion of an operation, and
      gate means coupled to said latch means and to said timing signal responsive means for providing a signal to initiate the next sequential operation when said operation completion signal occurs prior to said allotted time passage signal and for providing a signal to discontinue the sequence of operations if said allotted time passage signal occurs prior to said operation completion signal, said gate means being coupled to the next sequential logic circuit and to a preceding logic circuit for enabling said next circuit to respond to said timing signals and for resetting said preceding logic circuit when said operation completion signal occurs prior to said allotted time passage signal.

7. A control system as claimed in claim 6 wherein each of said timing signal responsive means is a digital counter for counting a predetermined number of said timing signals.

8. A control system for checking and controlling a sequence of operations comprising
   timing means for providing timing signals at intervals establishing a predetermined allotted time for completion of each operation, and
   a plurality of logic circuit corresponding to the number of operations to be performed, each logic circuit comprising:
      a digital counter for counting said timing pulses and for providing an output signal at a predetermined count,
      a bistable latch circuit for receiving and storing a signal indicating the completion of an operation,
      a first gate having an input coupled to an output of said latch circuit and another input coupled to an output of said counter for providing an output signal indicating the completion of an operation prior to the passage of an allotted time, and
      a second gate having an input coupled to another output of said latch circuit and another input coupled to the output of said counter for providing a signal indicating the passage of the allotted time prior to the completion of the operation,
      the output of said first gate being coupled to an input of the counter of the next sequential logic circuit for permitting the counter to count only if said output signal is provided from said first gate, the output of said first gate also being coupled to reset a sequentially preceding latch means.

9. A control system as claimed in claim 8 further comprising switch means between said latch circuit and said first gate for programming the time occurrence of said signal indicating the completion of an operation within the allotted time.

10. A control system as claimed in claim 8 further comprising an additional counter connected to the output of said digital counter for delaying the occurrence of a signal indicating the passage of the allotted time prior to the completion of the operation.

* * * * *